July 14, 1942.

H. A. C. BRINKMANN 2,289,872

METHOD OF FORMING TENPINS

Filed May 17, 1940

3 Sheets-Sheet 1

INVENTOR
HARRY A. C. BRINKMANN
BY Minturn Minturn,
ATTORNEYS.

July 14, 1942.  H. A. C. BRINKMANN  2,289,872
METHOD OF FORMING TENPINS
Filed May 17, 1940  3 Sheets-Sheet 2
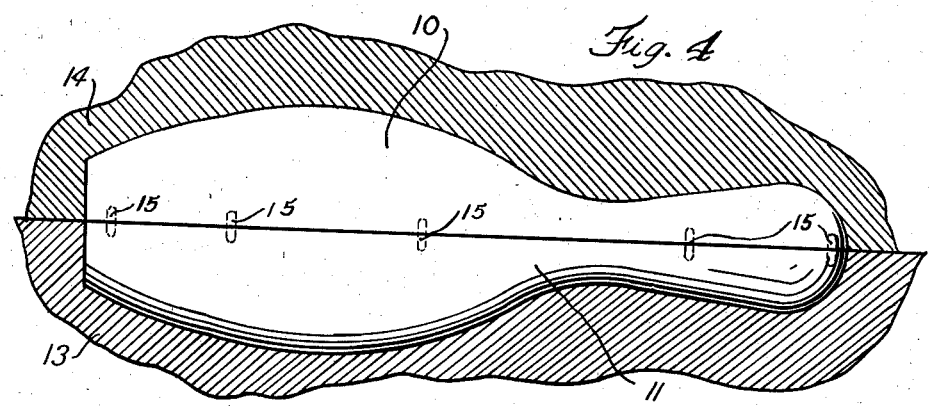
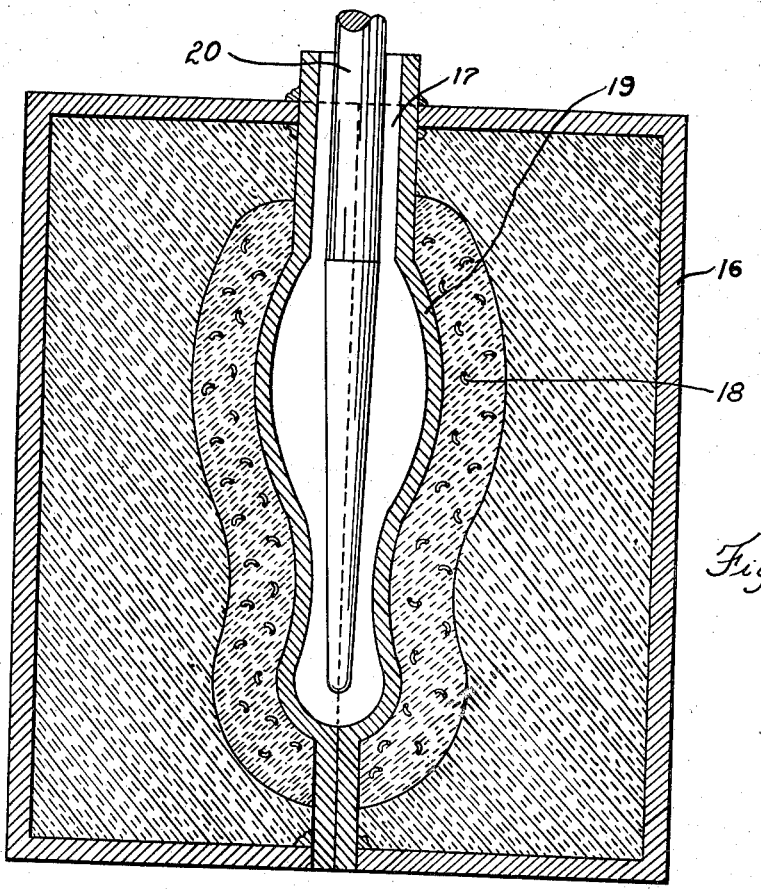
INVENTOR,
HARRY A. C. BRINKMANN,
BY Minturn & Minturn,
ATTORNEYS.

July 14, 1942.　　H. A. C. BRINKMANN　　2,289,872
METHOD OF FORMING TENPINS
Filed May 17, 1940　　3 Sheets-Sheet 3

INVENTOR,
HARRY A. C. BRINKMANN,
BY Minturn & Minturn,
ATTORNEYS.

Patented July 14, 1942

2,289,872

UNITED STATES PATENT OFFICE 2,289,872

METHOD OF FORMING TENPINS

Harry A. C. Brinkmann, Indianapolis, Ind.

Application May 17, 1940, Serial No. 335,799

1 Claim. (Cl. 18—59)

This invention relates to bowling tenpins and particularly to a tenpin made out of a molded plastic material. The invention relates primarily to the method of forming the pin from suitable plastic materials and has for a primary object the formation of a pin that will conform exactly to the standards required and as now incorporated in maple wood pins, but will have a much greater impact strength and freedom from splintering and cracking so that the pin is in reality substantially unbreakable, at least under the uses encountered in the normal bowling games.

A further important object of the invention is to form the pin in such a manner that its weight may be controlled to come within the prescribed limits simply by increasing or decreasing the wall thickness.

Figure 1:
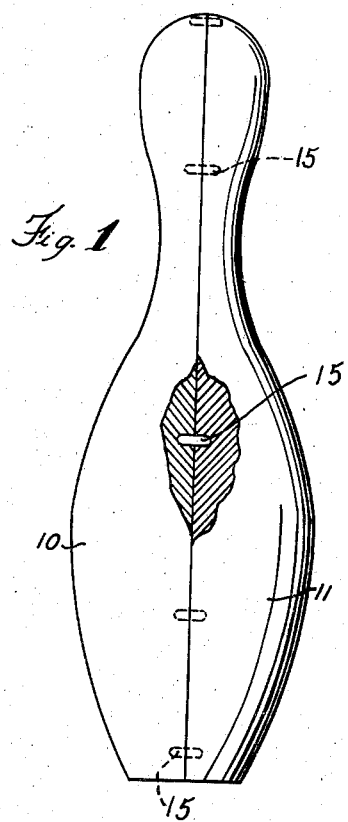
Figure 3:
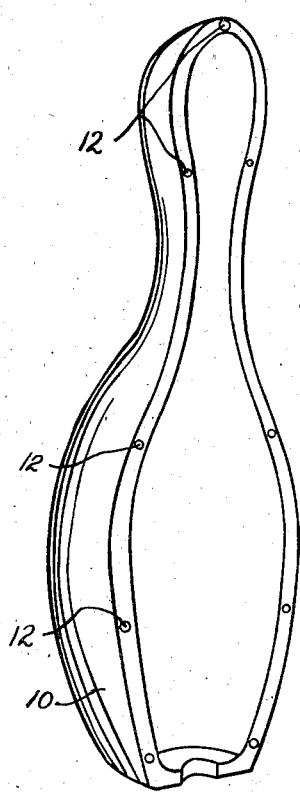
Figure 2:
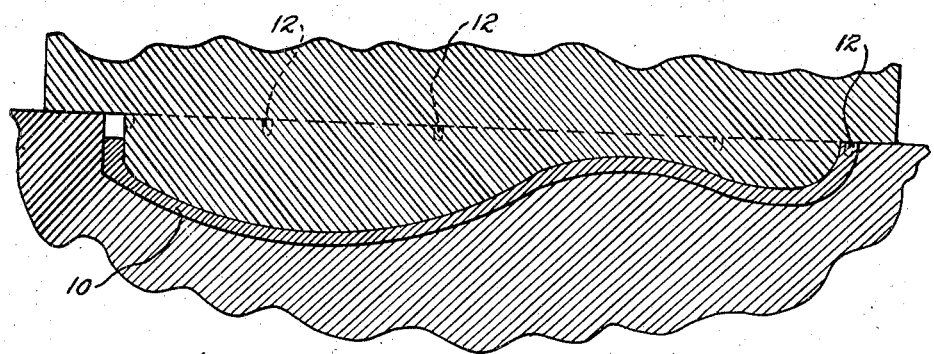
Figure 6:
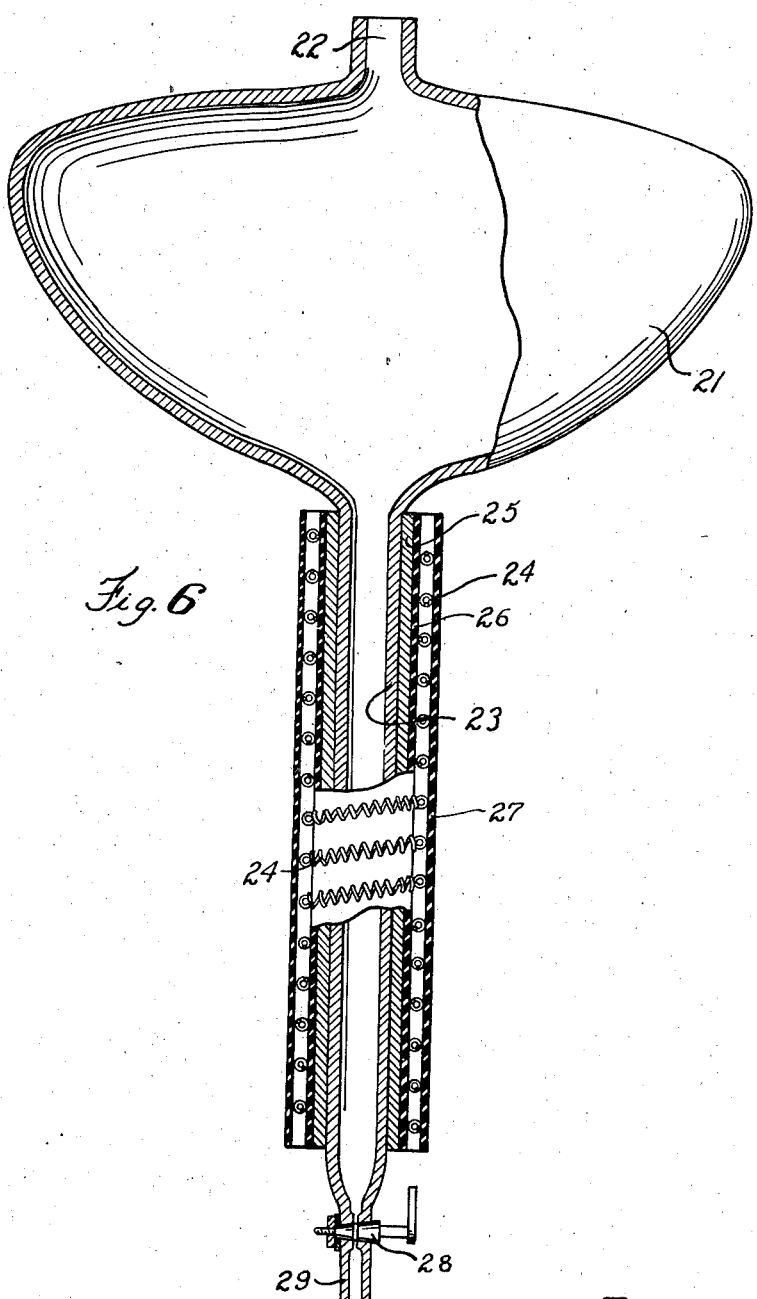

These and other objects and advantages of the invention will become apparent to those versed in the art in the following description of the invention as illustrated more or less diagrammatically in the accompanying drawings, in which Fig. 1 is a view in side elevation of a pin made in accordance with the invention;

Fig. 2, a diagrammatic representation of a mold in longitudinal central section for forming half of the pin;

Fig. 3, a view in perspective of the molded product formed by the mold shown in Fig. 2;

Fig. 4, a detail in longitudinal central section of pressed members for aligning and pressing together parts of the pin;

Fig. 5, a central vertical section through a two-part mold employed to form the pin in one piece; and Fig. 6, a view in side elevation and section of means for melting and charging plastic materials into molds.

Like characters of reference indicate like parts throughout the several views in the drawings.

Referring first to that form of the invention as illustrated in Figs. 1-4, the pin is formed in two identical sections 10 and 11. These sections, after being formed, are then placed together to have a plastic solvent applied over their adjacent opposing faces and then pressed together to have a perfect bond formed entirely around the contacting areas of the two sections so that in effect a single unitary structure is finally obtained.

If the pin sections are to be formed by compression or injection molding, then one of the plastics, such as the cellulose acetate butyrate offered by the Tennessee Eastman Corporation under the trade name "Tenite II," or one similar thereto, is employed. In any event the plastic is placed in the cavity of the mold, Fig. 2, in the granular form and the mold closed under suitable pressure with application of heat to form the section 10. Preferably the marginal edges of the section 10 are provided with circular indentations 12, herein shown as four on each side, Fig. 3, and one at the top.

The sections formed by the mold as indicated in Fig. 2 are immediately ready for assembly. This assembly is formed by placing one section over another, Fig. 4, between suitable press members 13 and 14 which are very accurately formed and aligned so that the two sections 10 and 11 are brought together without any offset at their junction. This alignment is facilitated by placing a dowel pin 15 in each of the circular holes formed by the matching round openings 12. The dowels 15 are preferably made out of the same plastic material as that of the sections. Before bringing the two sections 10 together, their opposing surfaces are coated with a suitable bonding material in the nature of acetone and then the presses closed to force the two members one compressively against the other. Upon release from the press, the two sections 10 are then bonded one to the other into an integral unit.

The pin thus formed is hollow and yet has an integrally closed lower end. Obviously by changing the mold parts as shown in Fig. 2, the thickness of the pin wall section may be varied to give the desired wall thickness to meet the weight requirements. Any "flash" appearing around the bonded edge may be trimmed off following which the juncture becomes practically invisible.

Where the plastic material does not require pressure but simply heat, the pin may be formed in a mold such as is indicated in Fig. 5 where the molding powder may be poured into the two-part mold 16 into the cavity 17 therein. Electrical heating elements 18 are embedded around the wall 19 forming the chamber in the mold to melt down the molding powder. To create the desired cavity in the pin, a core 20 is suspended within the chamber as indicated. When the mold has been completely filled by the melted powder, the two parts of the mold are separated and the core 20 withdrawn from the molded pin and then the base is cut off to be at right angle to the axis of the pin. The base may be closed if desired by cementing a piece of plastic material thereacross.

While the use of the mold as shown in Fig. 5 has been described in reference to filling the mold with powder and allowing it to melt down and adding additional powder until the melted powder completely fills the mold to the desired heighth, a form of means for charging the mold is indicated in Fig. 6. In this form, there is an upper receptacle 21 having an opening 22 through which the plastic in powder or granulated form is charged. From the under side of the receptacle 21 extends an elongated tubular member 23 about which is placed an electric heating element 24. Preferably a layer of low fusing metal 25, such as lead, is wrapped around the outside of the member 23 to be covered by an insulating wall 26 against which the heating element 24 bears. A suitable outer heat insulation wall 27 surrounds the heating element 24. The lower end of the tubular member 23 is closed off in any suitable manner, such as by a valve 28. The plastic material charged into the receptacle 21 drops down inside of the member 23 where it is heated by the surrounding coil 24. The lower end of the member 23 below the valve 28 is preferably reduced in diameter to form a nozzle 29 that may be short or long depending upon the use of the charging device. Where the device is to be used in types of molds such as is indicated in Fig. 5, the nozzle 29 may be extended down into the mold to form the core. In any event when the valve 28 is opened to allow the liquid plastic to flow out, this stream will be maintained by reason of the fact that the granulated material in the receptacle 21 is heated as it drops down through the member 23 to become liquid at the lower end. The rate of flow past the nozzle 29 is so controlled as to permit this liquefying of the plastic material as it passes through the member 23. The length of the member 23 in any event depends upon the speed desired in charging the mold. Also the receptacle 21 is so formed in reference to its opening 22 that pressure may be applied in order to force the plastic material on out and in addition to create pressure on the liquefied plastic in the mold.

By passing the plastic material down through the tube 23, a very uniform and efficient heating of that material is obtained. Furthermore by employing the lead lining, this material will melt before any damage to the plastic is caused by overheating should the flow become stopped or an excess of current be applied to the element 24. The charging device just described has the advantage of permitting an initial preheating of the granular material as well as a drying action while it is in the upper end of the tube 23 and in the lower end of the receptacle 21.

While the invention has been described in the one particular form as above indicated, it is obvious that changes may be employed, such as in the means for aligning the two sections of the pin when brought together for bonding, without departing from the spirit of the invention and I, therefore, do not desire to be limited to that precise form beyond the limitations as may be imposed by the following claim.

I claim:

The method of forming a tenpin which comprises molding a high impact strength thermoplastic into half pin sections each with a hollowed portion opening between marginal wall portions of the section, and with aligning means along those wall portions, turning one of those sections over a like section, applying a plastic solvent to those marginal wall portions, bringing the two opposing sections into alignment by said means and into wall portion abutment, and pressing those abutted sections together to effect a permanent bond directly between the plastic in each section through the dissolved surfaces thereof, said aligning means consisting of holes positioned in opposition across the marginal wall portions, and effecting said alignment by placing closely fitting solvent coated plastic dowel pins in said holes, the pins extending thereby into the holes of both sections.

HARRY A. C. BRINKMANN.